US012712692B2

(12) United States Patent
Niu et al.

(10) Patent No.: US 12,712,692 B2
(45) Date of Patent: Aug. 18, 2026

(54) METHODS AND APPARATUS FOR TIME-DOMAIN PRACH RESOURCE DETERMINATION IN WIRELESS COMMUNICATION

(71) Applicant: Apple Inc., Cupertino, CA (US)

(72) Inventors: Huaning Niu, Cupertino, CA (US); Chunhai Yao, Beijing (CN); Dawei Zhang, Cupertino, CA (US); Haitong Sun, Cupertino, CA (US); Hong He, Cupertino, CA (US); Oghenekome Oteri, Cupertino, CA (US); Sigen Ye, Cupertino, CA (US); Wei Zeng, Cupertino, CA (US); Weidong Yang, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/598,061

(22) PCT Filed: Jan. 14, 2021

(86) PCT No.: PCT/CN2021/071894
§ 371 (c)(1),
(2) Date: Sep. 24, 2021

(87) PCT Pub. No.: WO2022/151241
PCT Pub. Date: Jul. 21, 2022

(65) Prior Publication Data

US 2023/0345538 A1 Oct. 26, 2023

(51) Int. Cl.
*H04L 5/00* (2006.01)
*H04W 74/00* (2009.01)
*H04W 74/0833* (2024.01)

(52) U.S. Cl.
CPC ......... *H04L 5/0053* (2013.01); *H04W 74/006* (2013.01); *H04W 74/0833* (2013.01)

(58) Field of Classification Search
CPC ......... H04W 74/0841; H04W 74/0866; H04W 74/0833; H04W 74/006; H04W 56/004;
(Continued)

(56) References Cited

U.S. PATENT DOCUMENTS

2018/0124789 A1* 5/2018 Yerramalli ............ H04L 5/0048
2018/0302911 A1* 10/2018 Aijaz .................... H04L 12/189
(Continued)

FOREIGN PATENT DOCUMENTS

CN 110419259 A 11/2019
WO 2018/129123 A1 7/2018
(Continued)

OTHER PUBLICATIONS

Catt, "System Analysis of NR operation in 52.6GHz to 71 GHz", 3GPP TSG RAN WGJ #103-e R1-2007847, Nov. 13, 2020.
(Continued)

*Primary Examiner* — Mahran Y Abu Roumi
(74) *Attorney, Agent, or Firm* — Flare IP PLLC

(57) ABSTRACT

Disclosed are methods and apparatus to enhance RACH transmission for beyond 52.6 GHz communications. A Physical Random Access Channel (PRACH) configuration information including an indication of a PRACH preamble format for a predefined subcarrier spacing (SCS) to enhance cell coverage may be received. The PRACH configuration information may include a new PRACH preamble format in a time-domain based on a short sequence PRACH preamble format. Additionally, the PRACH preamble may be transmitted using the PRACH preamble format over a PRACH to
(Continued)

a base station (BS). The short sequence PRACH preamble format may be repeated over two consecutive time-domain RACH occasions (ROs).

16 Claims, 12 Drawing Sheets

(58) Field of Classification Search
CPC ....................... H04L 27/26025; H04L 5/1469; H04L 5/0053
See application file for complete search history.

(56) References Cited

U.S. PATENT DOCUMENTS

| | | | | |
|---|---|---|---|---|
| 2019/0159259 | A1* | 5/2019 | Kim | H04W 74/006 |
| 2019/0223228 | A1* | 7/2019 | Ko | H04W 74/002 |
| 2020/0037361 | A1* | 1/2020 | Chakraborty | H04L 5/0053 |
| 2021/0058971 | A1* | 2/2021 | MolavianJazi | H04L 5/0044 |
| 2021/0195649 | A1* | 6/2021 | Xue | H04W 72/20 |
| 2021/0337605 | A1* | 10/2021 | Yuan | H04W 72/27 |
| 2021/0376946 | A1* | 12/2021 | Zhang | H04W 74/0833 |
| 2021/0410138 | A1 | 12/2021 | Park et al. | |
| 2021/0410184 | A1* | 12/2021 | Talarico | H04L 5/005 |
| 2022/0061089 | A1* | 2/2022 | Wu | H04W 74/006 |
| 2022/0210844 | A1* | 6/2022 | MolavianJazi | H04L 5/0048 |
| 2022/0225414 | A1* | 7/2022 | Ma | H04B 7/0602 |
| 2022/0407649 | A1* | 12/2022 | Paredes Cabrera | H04L 5/0048 |
| 2023/0009307 | A1* | 1/2023 | Fang | H04W 74/006 |
| 2023/0143073 | A1* | 5/2023 | Li | H04W 74/0866 370/329 |
| 2023/0171813 | A1* | 6/2023 | Zheng | H04W 74/0841 370/329 |
| 2023/0254900 | A1* | 8/2023 | Khan | H04W 74/0866 370/329 |
| 2023/0371081 | A1* | 11/2023 | Ali | H04L 1/08 |
| 2023/0403055 | A1* | 12/2023 | Bhamri | H04W 74/0808 |

FOREIGN PATENT DOCUMENTS

| | | | |
|---|---|---|---|
| WO | 2019/027652 | A1 | 2/2019 |
| WO | 2020/092197 | A1 | 5/2020 |

OTHER PUBLICATIONS

Huawei et al., "PHY design in 52.6-71 GHz using NR waveform", 3GPP TSG RAN WGJ Meeting #103-e R1-2007604, Nov. 13, 2020, the whole document.

International Preliminary Report on Patentability received for PCT Patent Application No. PCT/CN2021/071894, mailed on Jul. 27, 2023, 5 pages.

International Search Report and Written Opinion received for PCT Patent Application No. PCT/CN2021/071894, mailed on Sep. 28, 2021, 7 pages.

LG Electronics, "Consideration on required physical layer changes to support NR above 52.6GHz", 3GPP TSG RAN WGJ #103-e R1-2008045, Nov. 13, 2020 the whole document.

Nokia et al., "Required changes to NR using existing DL/UL NR waveform", 3GPP TSG RAN WG1 #103 R1-2007926, Nov. 13, 2020, the whole document.

LG Electronics, "Initial access and mobility for NR-U", 3GPP TSG RAN WG1 #99 R1-1912390, Nov. 18-22, 2019, 16 pages.

Supplementary European Search Report and Search Opinion received for European Application No. 21918449.6, mailed on Feb. 12, 2024, 9 pages.

* cited by examiner

600

| | EN 302 567 V2.1.20 (2020-06) | EN 303 722 v0.0.4 (2020-05) | FCC 13-112A1 (Indoor/outdoor) |
|---|---|---|---|
| Fc Range | 57-71 GHz | 57-71 GHz | 57-71 GHz |
| PSD (eirp) | 23 dBm / Mhz | Fixed outdoor instllations with > 30 dBi transmit antenna gain 38 dBm/MHz<br>otherwise 23 dBm/MHz | N/A |
| RF output Power | 40 dBm | GA < 13 dBi, max eirp = 27 dBm + GA<br>13 dBi <= GA < 30 dBi, max eirp = 40 dBm<br>30 dBi <= GA (NOT fixed outdoor), max eirp = 40 dBm<br>30 dBi <= GA (fixed outdoor), max eirp = 55 dBm | Indoor:<br>Max avg, 40 dBm avg<br>Max peak, 43 dBm<br><br>Outdoor Point-toPoint:<br>Max avg, 82-2N dBm<br>Max peak, (85-2N) dBm<br>N = max (0, 51 dBi - GA) |
| Adaptivity (Medium Access Protocol) | LBT Mandatory | ATPC is mandatory | No requirements |
| Occupied Channel Bandwidth | at least 70% of the declared Nominal Channel Bandwidth | < 100 %.: It was agreed during BRAN#105 to replace "between 70% and 100% with "less than 100%". However, there was no discussion related ot the possible value of a lower limit (the 70%) with respect to the use of "nominal channel bandwidth" in clause 4.2.7.2.] | N/A |
| MCOT | 5 msecs | N/A | N/A |
| CCA Threshold | -47 dBm + 10 x log10 (Pmax / Pout) | N/A | N/A |

| Format | $L_{RA}$ | $\Delta f^{RA}$ | $N_u$ | $N_{CP}^{RA}$ | Support for restricted sets |
|---|---|---|---|---|---|
| | | | | | |
| A1 | 139 | $15 \cdot 2^{\mu}$ kHz | $2 \cdot 2048\kappa \cdot 2^{-\mu}$ | $288\kappa \cdot 2^{-\mu}$ | - |
| A2 | 139 | $15 \cdot 2^{\mu}$ kHz | $4 \cdot 2048\kappa \cdot 2^{-\mu}$ | $576\kappa \cdot 2^{-\mu}$ | - |
| A3 | 139 | $15 \cdot 2^{\mu}$ kHz | $6 \cdot 2048\kappa \cdot 2^{-\mu}$ | $864\kappa \cdot 2^{-\mu}$ | - |
| B1 | 139 | $15 \cdot 2^{\mu}$ kHz | $2 \cdot 2048\kappa \cdot 2^{-\mu}$ | $216\kappa \cdot 2^{-\mu}$ | - |
| B2 | 139 | $15 \cdot 2^{\mu}$ kHz | $4 \cdot 2048\kappa \cdot 2^{-\mu}$ | $360\kappa \cdot 2^{-\mu}$ | - |
| B3 | 139 | $15 \cdot 2^{\mu}$ kHz | $6 \cdot 2048\kappa \cdot 2^{-\mu}$ | $504\kappa \cdot 2^{-\mu}$ | - |
| B4 | 139 | $15 \cdot 2^{\mu}$ kHz | $12 \cdot 2048\kappa \cdot 2^{-\mu}$ | $936\kappa \cdot 2^{-\mu}$ | - |
| C0 | 139 | $15 \cdot 2^{\mu}$ kHz | $2048\kappa \cdot 2^{-\mu}$ | $1240\kappa \cdot 2^{-\mu}$ | - |
| C2 | 139 | $15 \cdot 2^{\mu}$ kHz | $4 \cdot 2048\kappa \cdot 2^{-\mu}$ | $2048\kappa \cdot 2^{-\mu}$ | |

| PRACH Config. Index | Preamble format | n_SFN mod x= X | Y | Slot number | Starting symbol | Number of PRACH slots within a 120 kHz slot | number of time-domain PRACH occassions within a PRACH slot | PRACH duration |
|---|---|---|---|---|---|---|---|---|
| 1 | | | | Range from 0 to 79 | | | | |
| XX | B5 | | | | | | | 24 |

METHODS AND APPARATUS FOR TIME-DOMAIN PRACH RESOURCE DETERMINATION IN WIRELESS COMMUNICATION

RELATED APPLICATIONS

The present application is the national phase of International Application No. PCT/CN2021/071894, filed on Jan. 14, 2021 and the disclosure of which is hereby incorporated herein by reference in its entirety.

FIELD OF INVENTION

This invention relates generally to the field of wireless communication, and more particularly, to methods and apparatus for determining time-domain PRACH resource in wireless communication devices.

BACKGROUND OF THE INVENTION

Operating frequencies beyond 52.6 Giga Hertz (GHz) (52.6 GHz to 71 GHz) may include extremely large spectrum bands. These extremely large spectrum bands may facilitate high capacity applications in New Radio (NR) system including Internet-of-Things (IoT), extremely high data rate mobile broadband, and device-to-device communications.

To support potential enhancement for Physical Random Access Channel (PRACH) transmission, it may be recommended for longer PRACH sequence lengths, including L=571 and L=1151 defined in Rel-16 NR specification to be used in NR operating in 52.6 GHz to 71 GHz in order to benefit from a higher transmit power. It may also be recommended to further investigate whether or not to support configurations that may enable non-consecutive RACH occasions in time domain to aid Listen-Before-Talk (LBT) processes if LBT is required. Additionally, it is noted that PRACH sub carrier spacing (SCS) selection may need to consider SCS of data/control channels and enablement of single subcarrier spacing operation. It is further identified that potential enhancements for PRACH may need to consider system coverage for PRACH with SCS larger than 120 kilo Hertz (kHz), if supported.

In NR system, 60 kHz and 120 kHz RACH may be supported. Different RACH format may be defined for FR1 and FR2. In 38.211, two big tables may define the RACH occasion (RO) for FR1 and FR2 for TDD. FR1 Random access configurations for FR1 may define RACH slot using 15 kHz slot index. 30 kHz SCS slot index may be derived from 15 kHz. FR2 random access configuration for FR2 may define RACH slot using 60 kHz slot index. 120 kHz SCS slot index may be derived from 60 kHz.

With 23 dBm power spectral density (PSD) limitation, assuming a user equipment (UE) capable of transmitting allowable 40 dBm peak Effective Isotropic Radiated Power (EIRP), peak EIRP may be achieved with 50 Mega Hertz (MHz) Bandwidth (BW). However, a longer sequence (larger than 50 MHz BW) may not bring any benefit. For example, a longer sequence may result in a potential loss due to more selective channels and a waste of frequency resource. For 120 kHz SCS, L=571 can be configured. In this configuration, occupied BW may include 68.5 MHz. When 480 kHz and 960 kHz RACH may be supported, only L=139 can be configured. When 60 kHz SCS may be supported for RACH in FR3, L=1151 can be supported to achieve peak EIRP. Alternatively, L=837 can be configured for 60 kHz SCS, resulting in an occupied BW of 50.22 MHz.

Thus, there is a need for an enhanced mechanism for NR PRACH transmission operating in a frequency beyond 52.6 GHz, thereby enhancing cell coverage.

SUMMARY OF THE DESCRIPTION

Methods and systems for enhancing RACH transmission to support beyond 52.6 GHz communications are disclosed. In one aspect, embodiments of the present disclosure provide a baseband processor of a wireless equipment (UE) configured to perform operations. The operations may include receiving a Physical Random Access Channel (PRACH) configuration information including an indication of a PRACH preamble format for a predefined subcarrier spacing (SCS) to enhance cell coverage. The PRACH configuration information may include a new PRACH preamble format in a time-domain based on a short sequence PRACH preamble format. The operations may also include transmitting a PRACH preamble using the PRACH preamble format over a PRACH to a base station (BS).

In some embodiments, the short sequence PRACH preamble format may be repeated over two consecutive time-domain RACH occasions (ROs). The short sequence PRACH preamble format may include B4 format.

In one disclosed embodiment, the new PRACH format may double a guard period (GP) and a cyclic prefix duration (NCP).

In some embodiments, the new PRACH preamble format may be defined in the time-domain based on a long sequence PRACH preamble format. The predefined SCS may include 120 kHz.

In an embodiment, the two consecutive ROs may be linked to synchronization signal block (SSB)/Channel State Information Reference Signal (CSI-RS) or two or more different SSBs/CSI-RSs.

In another embodiment, the two consecutive ROs may be allocated within the same frequency resource.

According to an embodiment of the present disclosure, a Random Access Radio Network Temporary Identifier (RA-RNTI) may be calculated based on a merge of the two consecutive ROs.

In an embodiment, the operations may further include receiving a PRACH configuration through signaling of a PRACH configuration index. The PRACH configuration index may indicate a number of PRACH slots within a 120 kilo Hertz (kHz) slot.

In yet another disclosed embodiment, a slot index of the predefined SCS may be derived from 120 kHz. A slot number may be between 0 to 79. A PRACH duration may be 24 for the new PRACH preamble format.

In another disclosed embodiment, two consecutive ROs may be merged into an RO with the predefined SCS.

In a further disclosed embodiment, a floor operation may be added to calculate a time index of a PRACH transmission symbol.

In some embodiments, the predefined SCS may include 480 kHz and 960 kHz. In another embodiment, the operations may further include transmitting a RACH as a short control signaling without the LBT.

In another aspect of the disclosure, embodiments of the present disclosure also provide a UE including at least one antenna, at least one radio, and at least one processor configured to perform the processes as described above.

In a further aspect of the disclosure, embodiments of the present disclosure also provide a base station (BS) including a processor configured to perform the processes as described above. Additionally, the operations may include generating a Physical Random Access Channel (PRACH) configuration information including an indication of a PRACH preamble format in a time-domain based on a short sequence PRACH preamble format for a predefined subcarrier spacing (SCS) to enhance cell coverage. Further, the operations may include transmitting the PRACH configuration information to a user equipment (UE).

BRIEF DESCRIPTION OF THE DRAWINGS

The present invention is illustrated by way of example and not limitation in the figures of the accompanying drawings in which like references indicate similar elements.

FIG. 6 depicts a table of a regulation limitation according to one aspect of the disclosure.

FIG. 7 depicts table 6.3.3.1-2 describing preamble format using short sequence according to one aspect of the disclosure.

FIG. 10 depicts a modified PRACH configuration according to one aspect of the disclosure.

DETAILED DESCRIPTION

Methods and apparatus for enhancing Random Access Channel (RACH) transmission for frequency greater than 52.6 Giga Hertz (GHz) in wireless communication devices are disclosed. A Physical Random Access Channel (PRACH) configuration information including an indication of a PRACH preamble format for a predefined subcarrier spacing (SCS) to enhance cell coverage may be received. The PRACH configuration information may include a new PRACH preamble format in a time-domain based on a short sequence PRACH preamble format. The PRACH preamble may be transmitted using the PRACH preamble format over a PRACH to a base station (BS). When implemented, this enhanced mechanism for NR PRACH transmission operating in a frequency beyond 52.6 GHz may enhance cell coverage.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

Figure 1:
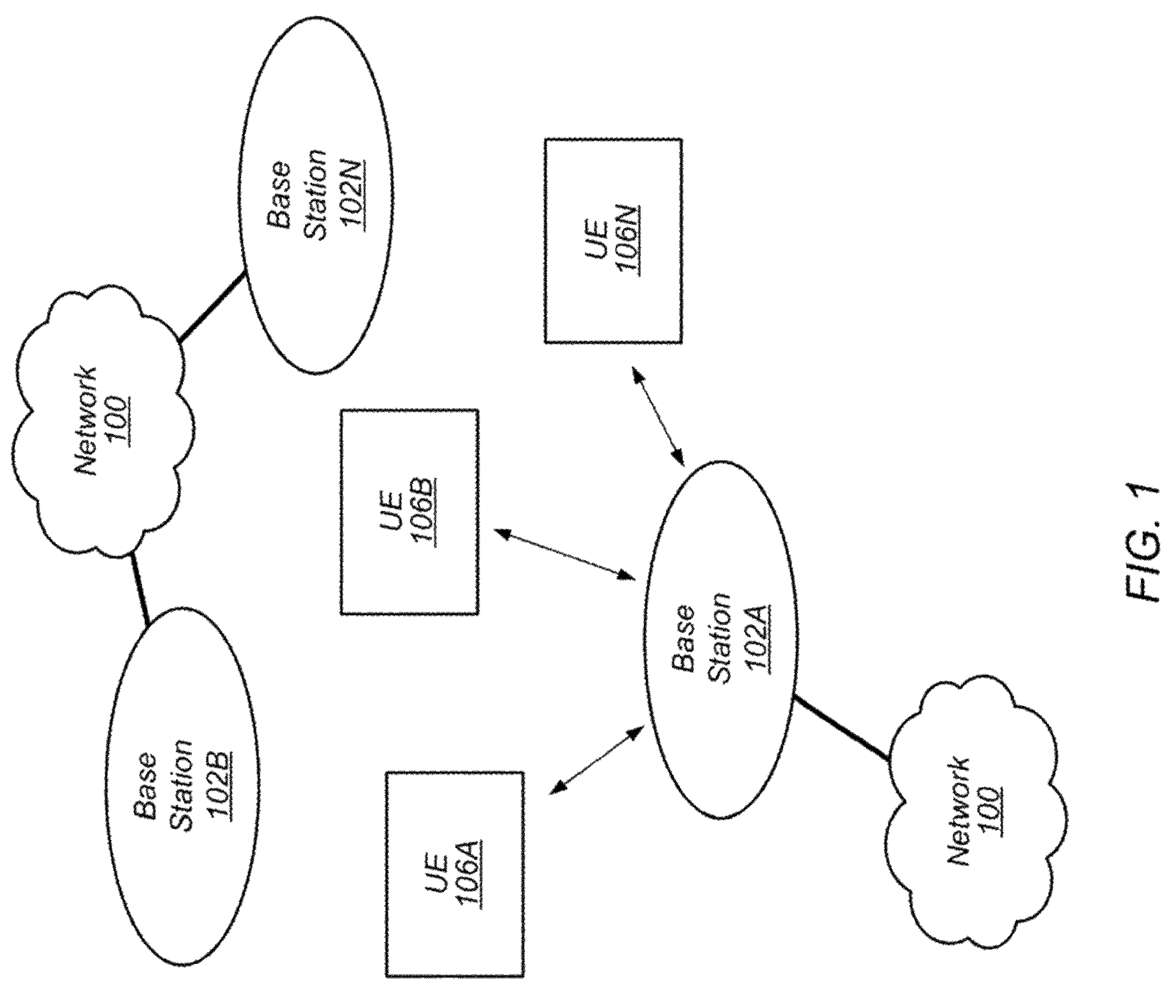
FIG. 1 illustrates an example wireless communication system according to one aspect of the disclosure.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
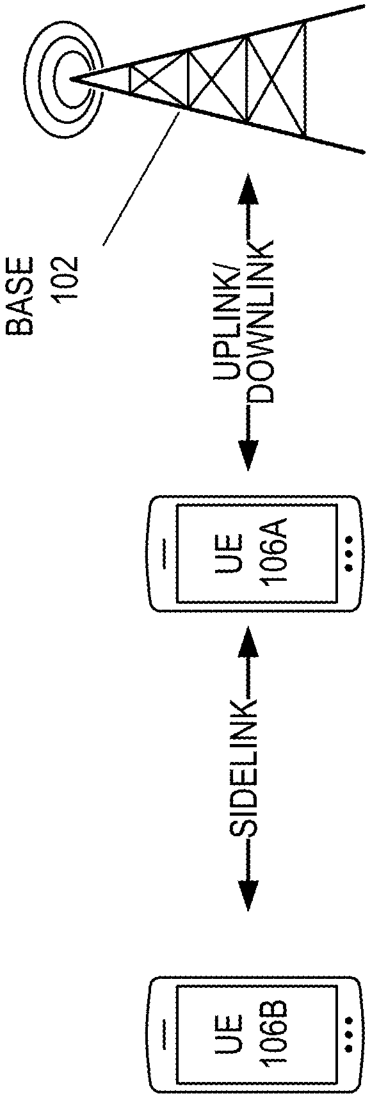
FIG. 2 illustrates user equipment 106A and 106B that can be in direct communication with each other (also known as device to device or sidelink) according to one aspect of the disclosure.

FIG. 2 illustrates user equipment 106A and 106B that can be in direct communication with each other (also known as device to device or sidelink). Sidelink communication can utilize dedicated sidelink channels and sidelink protocols to facilitate communication directly between devices. For example, physical sidelink control channel (PSCCH) can be used for actual data transmission between the devices, physical sidelink shared channel (PSSCH) can be used for conveying sidelink control information (SCI), physical sidelink feedback channel (PSFCH) can be used for HARQ feedback information, and physical sidelink broadcast channel (PSBCH) can be used for synchronization. Additional details are discussed in other sections.

In addition, sidelink communications can be used for communications between vehicles to vehicles (V2V), vehicle to infrastructure (V2I), vehicle to people (V2P), vehicle to network (V2N), and other types of direct communications.

UE 106A can also be in communication with a base station 102 in through uplink and downlink communications, according to some embodiments. The UEs may each be a device with cellular communication capability such as a mobile phone, a hand-held device, a computer or a tablet, or virtually any type of wireless device. The UEs 106A-B may include a processor that is configured to execute program instructions stored in memory. The UEs 106A-B may perform any of the method embodiments described herein by executing such stored instructions. Alternatively, or in addition, the UEs 106A-B may include a programmable hardware element such as an FPGA (field-programmable gate array) that is configured to perform any of the method embodiments described herein, or any portion of any of the method embodiments described herein.

The UEs 106A-B may include one or more antennas for communicating using one or more wireless communication protocols or technologies. In some embodiments, the UEs 106A-B may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UEs 106A-B may share one or more parts of a receive and/or transmit chain between multiple wireless communication technologies, such as those discussed above.

In some embodiments, the UEs 106A-B may include separate transmit and/or receive chains (e.g., including separate antennas and other radio components) for each wireless communication protocol with which it is configured to communicate. As a further possibility, the UEs 106A-B may include one or more radios which are shared between multiple wireless communication protocols, and one or more radios which are used exclusively by a single wireless communication protocol. For example, the UE 106A-B might include a shared radio for communicating using either of LTE or 5G NR (or LTE or 1×RTT or LTE or GSM), and separate radios for communicating using each of Wi-Fi and Bluetooth. Other configurations are also possible.

Figure 3:
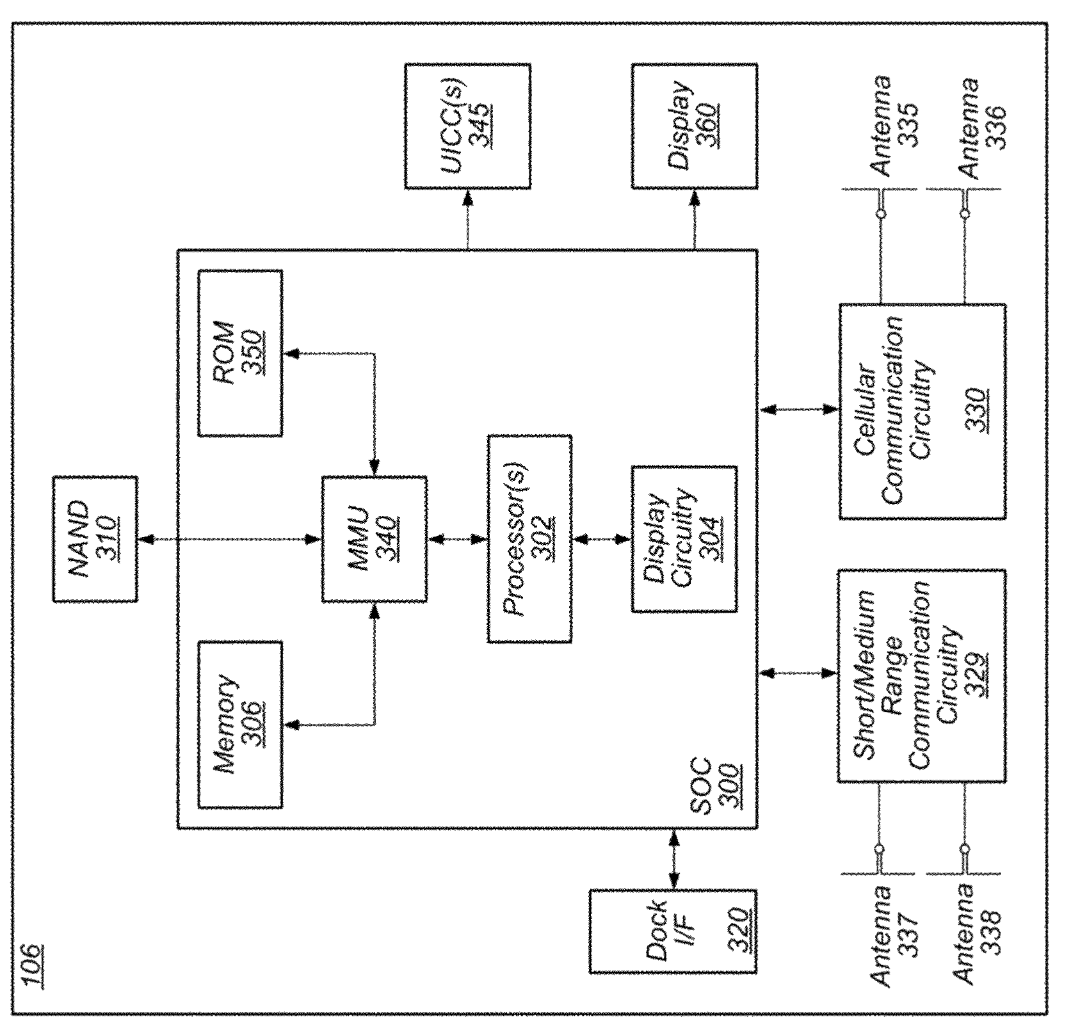
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE)

device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly; dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
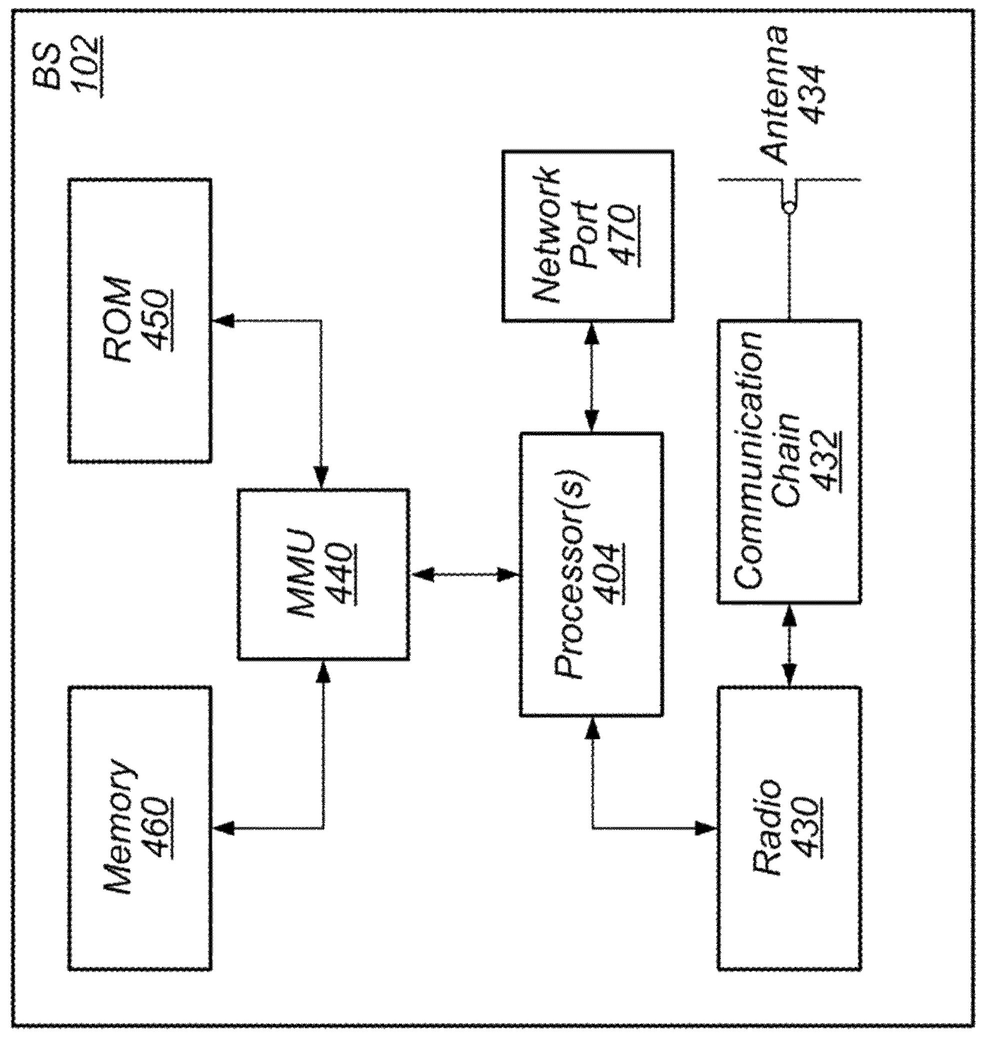
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
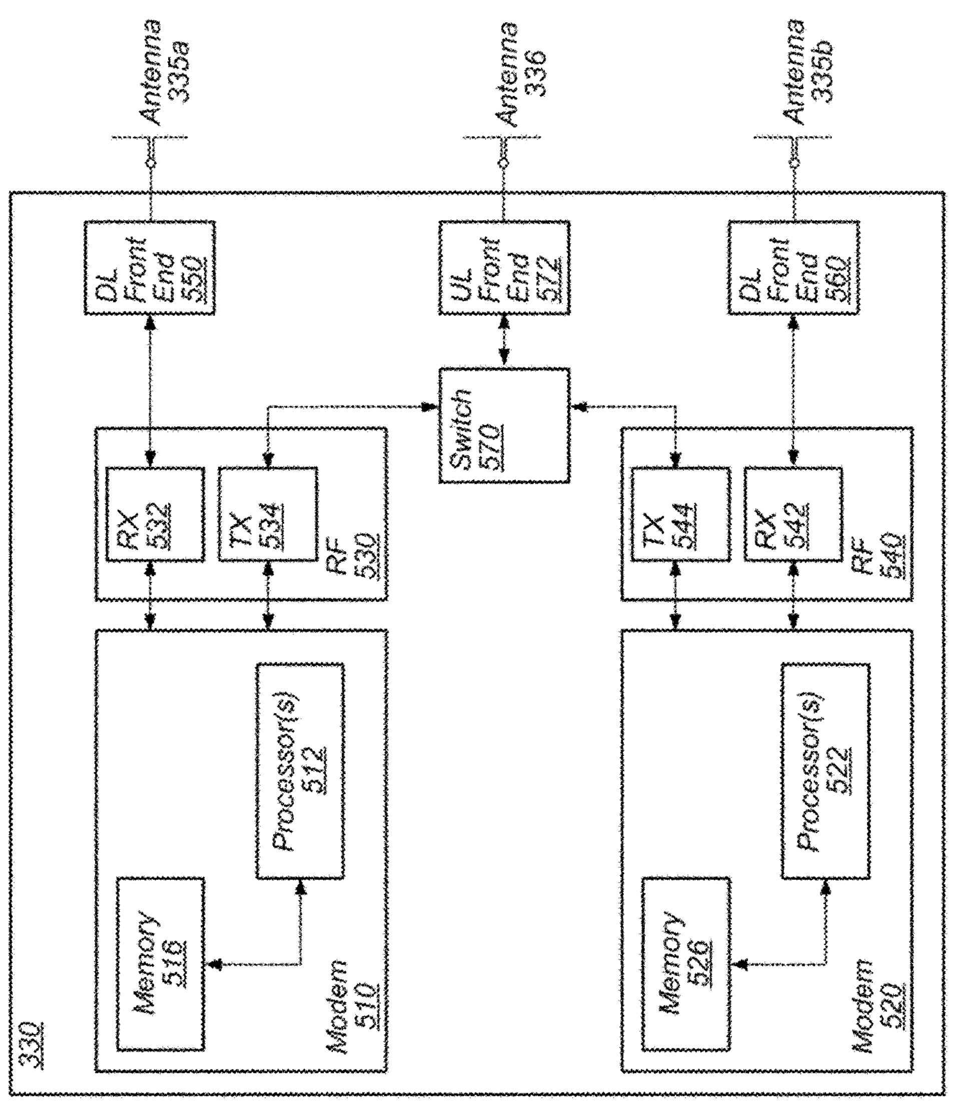
FIG. 5 illustrates an example block diagram of cellular communication circuitry according to one aspect of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a*-*b* and 336 as shown (in FIG. 3). In some embodiments, cellular communication circuitry 330 may include dedicated receive chains (including and/or coupled to, e.g., communicatively; directly or indirectly; dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

A baseband processor of a wireless equipment (UE) may be configured to perform operations for enhancing RACH transmission to support beyond 52.6 GHz communications. The operations may include receiving a Physical Random Access Channel (PRACH) configuration information including an indication of a PRACH preamble format for a predefined subcarrier spacing (SCS) to enhance cell coverage. The PRACH configuration information may include a new PRACH preamble format in a time-domain based on a short sequence PRACH preamble format. Additionally, the operations may include transmitting a PRACH preamble using the PRACH preamble format over a PRACH to a base station (BS)

In an embodiment, PRACH preamble formats may be written in the specification. An additional format may be added to the existing nine PRACH preamble formats for FR2. The base station (BS) (e.g., gNB) may determine one out of the all possible PRACH preamble formats based on a real deployment. Thereafter, the BS may transmit the determined PRACH preamble format as a part of the PRACH configuration to the UE. PRACH preamble formats may be defined for different link budgets (path loss) or round-trip time (RTT) (i.e., round trip delay which may be mainly related to a cell size). In some embodiments, the real deployment which can result in a PRACH preamble format preference as described above may include indoor or outdoor, large cell size or small cell size, open space without blockages (i.e., mostly line-of-sight (LOS)), or areas with blockages by buildings (i.e., non-line-of-sight (nLOS)).

In some embodiments, a longer sequence length may be supported for all RACH formats. A separate signaling of SCS for Message 1 and RACH sequence may be implemented and signaled in System Information Block 1(SIB1). Base station (gNB) may ensure proper combination of SCS and sequence. A longer sequence for SCS 120 kHz and SCS 60 kHz may be explicitly specified in 38.211 according to table 6.3.3.2-1.

Because longer sequence may be added for coverage extension, the sequence length may only be supported for format B4. B4 has the best coverage of all RACH format. This can be signaled as format B5. User Equipment (UE) capability may be defined to support 40 dB EIRP or a long sequence format. Longer sequence with 40 dB EIRP may only apply to certain UE. Typical UE max EIRP may be limited regardless of regulation rule requirement (see FIG. 6). FIG. 6 illustrates a regulation rule requirement table 600 for the operating frequency range between 57 to 71 GHz for the European countries and the USA. In a non-standalone network deployment, where the UE may perform initial access other than FR3, the UE can send peak EIRP capability for FR3 to the network. When the UE indicate 40 dBm peak EIRP capability, the network can configure the longer sequence to the UE with 120 kHz SCS or 60 kHz SCS. The capability can also be supported for max sequence instead of peak EIRP. Whereas, in standalone network deployment, the network can adjust a RACH configuration after the UE capability is fed back.

Figure 8:
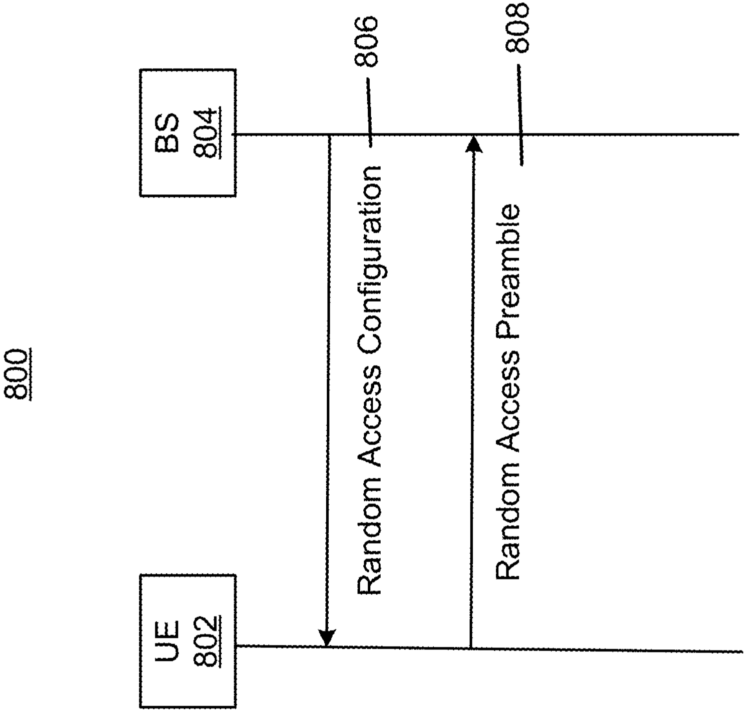
FIG. 8 is a communication flow of some embodiments of signaling between a user equipment (UE) and a base station (BS) for an NR random access procedure according to one aspect of the disclosure.

FIG. 8 illustrates an example of a communication flow of some embodiments of signaling between a user equipment (UE) and a base station (BS) for an NR random access procedure, according to some embodiments. Referring to FIG. 8, a base station (BS) (e.g., 804) including a processor may be configured to perform NR random access procedure. A Physical Random Access Channel (PRACH) configuration information including a PRACH preamble format for a predefined subcarrier spacing (SCS) to enhance cell coverage may be generated by the BS. The PRACH configuration information may include a new PRACH preamble format (which will be described in detail below) in a time-domain based on a short sequence PRACH preamble format. As further illustrated by the communication flow 806 in FIG. 8, the PRACH configuration information may be transmitted by the BS to a UE. Thereafter, the Physical Random Access Channel (PRACH) configuration information including an indication of a PRACH preamble format for a predefined subcarrier spacing (SCS) to enhance cell coverage may be received by the UE. The PRACH configuration information may include a new PRACH preamble format in a time-domain based on a short sequence PRACH preamble format. Then, as illustrated by the communication flow 808 in FIG. 8, a PRACH preamble may be transmitted, by the UE, using the PRACH preamble format over a PRACH to a base station (BS).

In one embodiment, a longer sequence may only extend range for SCS 120 kHz. For SCS 480 kHz or SCS 960 kHz, the range may be extended using a larger number of repetition for sequence duration, Tseq. To achieve the larger number of repetition for Tseq, a new PRACH preamble format as described above, including B5 format in a time-domain based on a short sequence PRACH preamble format may be defined. This enhanced mechanism generating new PRACH preamble format for NR PRACH transmission operating in a frequency beyond 52.6 GHz may enhance cell coverage.

Figure 9:
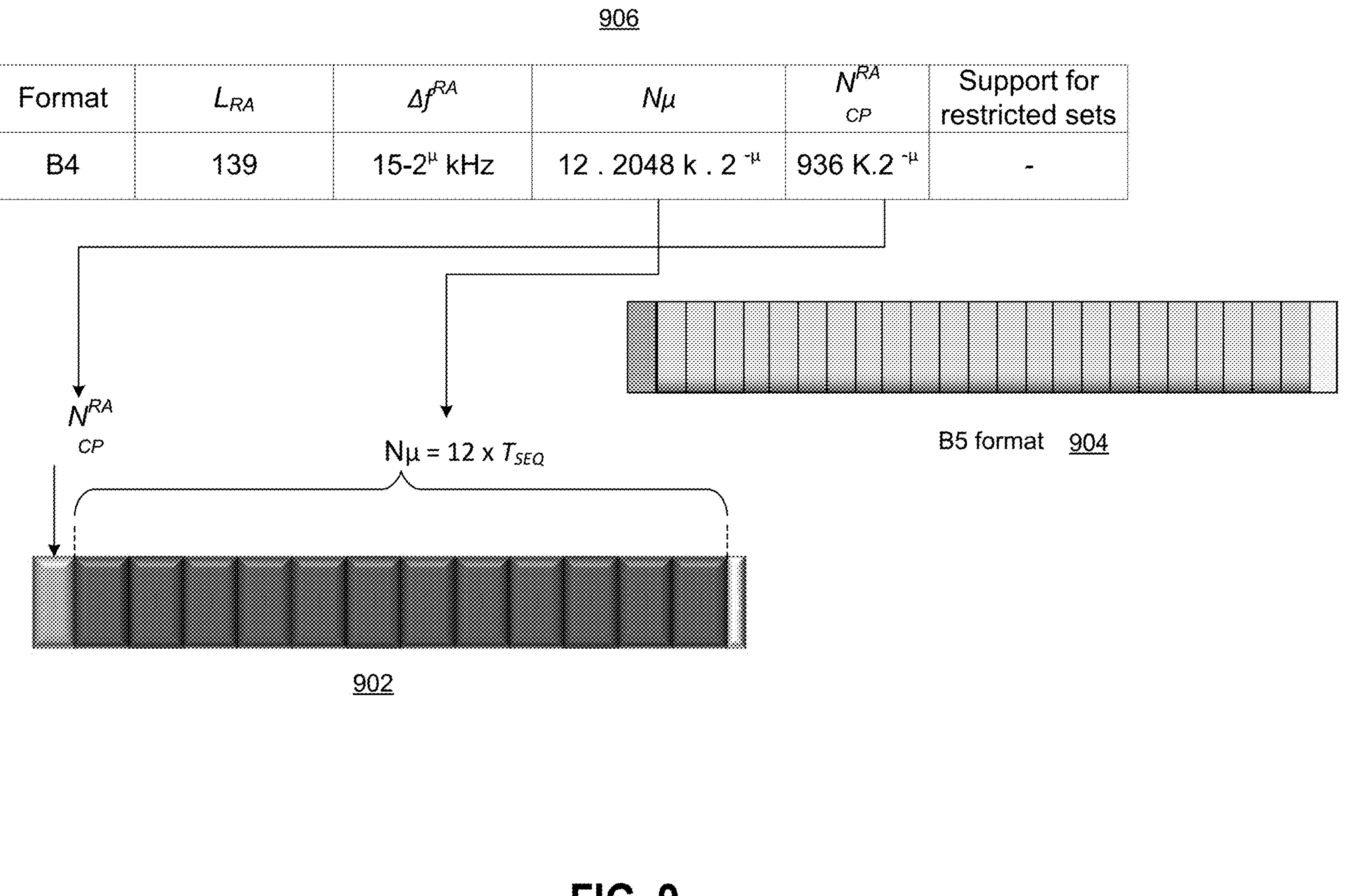
FIG. 9 depicts a longer format or repetition for a coverage of RACH with a larger number Nu according to one aspect of the disclosure.

FIG. 9 shows an example of a longer format or repetition for a coverage of RACH with larger number Nu according to one aspect of the disclosure. Referring to FIG. 9, this new B5 format (e.g., 902) may be based on the short sequence PRACH preamble format (see table 700 in FIG. 7), such as B4 format 906 because B4 format 906 is the longest repetition with 12 sequence. This new B5 format coverage extension may extend to 12 sequence 902 or even longer sequence such as 24 904. NCP and guard period (GP) may also double from B4 format. The new PRACH format may double a guard period (GP) and a cyclic prefix duration (NCP). In one embodiment, NCP may equal 1872 (936*2). In another embodiment, GP may equal 1944 (792*2).

Alternatively, the transmission of the short sequence PRACH preamble format, such as B4 format may be repeated over two RO. The gap period in the middle may reduce to performance. However, in this example, a new row of the new B5 format is needed in the configuration table. The two consecutive ROs may be linked to synchronization signal block (SSB) or Channel State Information Reference Signal (CSI-RS) or two or more different SSBs or CSI-RSs. The two ROs may be allocated within the same frequency resource. A Random Access Radio Network Temporary Identifier (RA-RNTI) may be calculated based on a merge of the two consecutive ROs. In some other embodiments, the Physical Random Access Channel (PRACH) configuration information may include an indication of a PRACH preamble format in a time-domain based on a long sequence PRACH preamble format. The predefined SCS may include 120 kHz.

In some embodiments, a PRACH configuration may be transmitted by the BS through signaling of a PRACH configuration index. The PRACH configuration index may indicate a number of PRACH slots within a 120 kilo Hertz (kHz) slot.

FIG. 10 depicts a modified PRACH configuration according to one aspect of the disclosure. In terms of signaling between the BS and the UE, a new RACH table 1000 shown in FIG. 10 may be defined for FR3. As shown, the new RACH table may include a modification including a baseline slot index based on 120 kHz slots. The slot number in the table may range from 0 to 79. In some embodiments, a PRACH duration may equal 24 for the new PRACH preamble format. Regarding SCS including 240 kHz, or 480 kHz or 960 kHz, the RO may be derived based on 120 kHz SCS, following the same rule as R15. As shown in the new table 1000, a new row may include B5 format. Alternatively, new rows extending from 256 to a larger row number may be added. In RACH-configGeneric, new row may be added for R17 to signal B5 format.

In some other embodiments, the two consecutive ROs may be merged into an RO with the predefined SCS (e.g., higher SCS, including 480 kHz and 960 kHz). The time index may be modified from $$l = l_0 + n_t^{RA} + N_{dur}^{RA} + 14n_{slot}^{RA} \text{ to } l = \text{floor}\left(\left[l_0 + n_t^{RA} + N_{dur}^{RA} + 14n_{slot}^{RA}\right]/2\right) * 2.$$

As shown in the above equation, a floor operation may be added to calculate a time index of a PRACH transmission symbol.

Regarding an LBT gap, RACH may be transmitted as short control signaling. No LBT requirement may be needed. RACH may be explicitly specified as a short control signaling in the specification. In RACH-configCommon, one field may be added to specify if short control signaling is enabled for RACH. Alternatively, RACH is hard written in the specification to transmit as short control signaling. Short control signaling can be used for all RACH formats. Alternatively, short control signaling can be enabled for RACH formats where the gap is less than Clear Channel Assessment (CCA) sensing time of 23 μs.

CCA Check definition may include the following procedure. A CCA check may be initiated at the end of an operating channel occupied slot time. Upon observing that Operating Channel may not be occupied for a minimum of 8 μs, transmission deferring may occur. The transmission deferring may last for a minimum of random (0 to Max number) number of empty slots periods. Max number may not be lower than 3.

Figure 11:
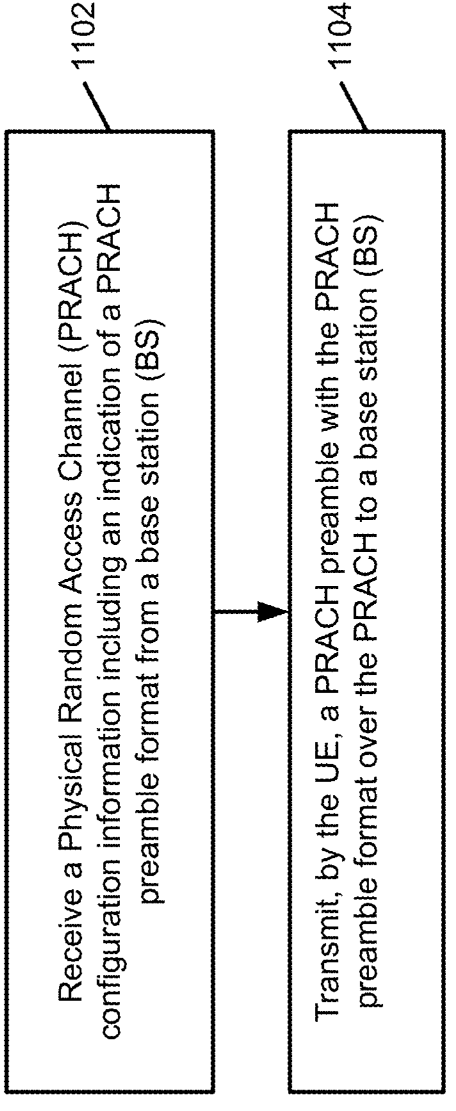
FIG. 11 depicts a flow diagram of a method by a user equipment (UE) for enhancing RACH transmission to support beyond 52.6 GHz resources in wireless communication devices according to one aspect of the disclosure.

FIG. 11 illustrates a flow diagram of a method 1100 by the UE for enhancing RACH transmission to support beyond 52.6 GHz resources in wireless communication devices, according to some embodiments. Process 1100 may be performed by processing logic which may include software, hardware, or a combination thereof. Referring to FIG. 11, in operation 1102, a Physical Random Access Channel (PRACH) configuration information including an indication of a PRACH preamble format for a predefined subcarrier spacing (SCS) to enhance cell coverage may be received. The PRACH configuration information may include a new PRACH preamble format in a time-domain based on a short sequence PRACH preamble format. Additionally, in operation 1104, a PRACH preamble using the PRACH preamble format may be transmitted by the UE over a PRACH to a base station (BS).

Figure 12:
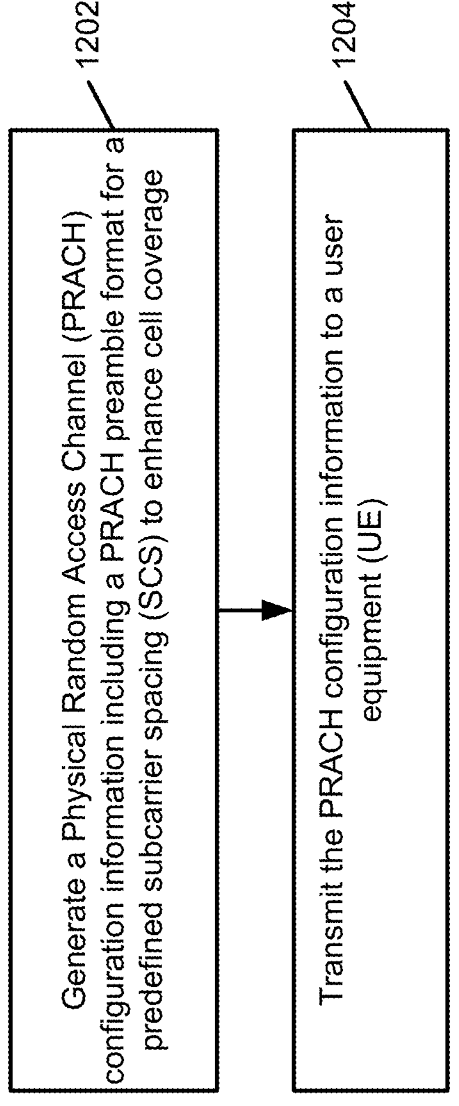
FIG. 12 depicts a flow diagram of a method by a base station (BS) for enhancing RACH transmission to support beyond 52.6 GHz resources in wireless communication devices according to one aspect of the disclosure.

FIG. 12 illustrates a flow diagram of a method 1200 by the BS for enhancing RACH transmission to support beyond 52.6 GHz resources in wireless communication devices, according to some embodiments. Process 1200 may be performed by processing logic which may include software, hardware, or a combination thereof. Referring to FIG. 12, in operation 1202, a Physical Random Access Channel (PRACH) configuration information including an indication of a PRACH preamble format in a time-domain based on a short sequence PRACH preamble format for a predefined subcarrier spacing (SCS) to enhance cell coverage may be generated. The configuration information may include a new PRACH preamble format in a time-domain based on a short sequence PRACH preamble format.

In operation 1204, the PRACH configuration information may be transmitted to a user equipment (UE).

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A baseband processor of a wireless equipment (UE) configured to perform operations comprising:

receiving Physical Random Access Channel (PRACH) configuration information including an indication of a first PRACH preamble format for a predefined subcarrier spacing (SCS) to enhance cell coverage, wherein the PRACH configuration information further includes a field that indicates a second PRACH preamble format in a time-domain based on a short sequence PRACH preamble format that extends the short sequence PRACH preamble format, wherein the short sequence PRACH preamble format is repeated over two consecutive time-domain random access channel (RACH) occasions (ROs) and the two consecutive ROs are linked to a synchronization signal block (SSB)/Channel State Information Reference Signal (CSI-RS) or two or more different SSBs/CSI-RSs;

receiving RACH configuration information;

transmitting a PRACH preamble using the first and second PRACH preamble formats over a PRACH to a base station (BS); and based on a field comprised in the RACH configuration information that indicates that a listen before talk (LBT) procedure is not required before a RACH procedure, transmitting a RACH Message 1 as a short control signaling without performing the LBT procedure.

2. The baseband processor of claim 1, wherein the short sequence PRACH preamble format includes B4 format.

3. The baseband processor of claim 1, wherein the second PRACH preamble format doubles a guard period (GP) and a cyclic prefix duration (NCP).

4. The baseband processor of claim 1, wherein the second PRACH preamble format is defined in the time-domain based on a long sequence PRACH preamble format, and wherein the predefined SCS includes 120 kilohertz (kHz).

5. The baseband processor of claim 1, wherein the two consecutive ROs are allocated within a same frequency resource.

6. The baseband processor of claim 1, wherein a Random Access Radio Network Temporary Identifier (RA-RNTI) is calculated based on a merge of the two consecutive ROs.

7. The baseband processor of claim 1, wherein the operations further comprise:

receiving a PRACH configuration through signaling of a PRACH configuration index, wherein the PRACH configuration index indicates a number of PRACH slots within a 120 kilohertz (kHz) slot.

8. The baseband processor of claim 7, wherein a slot index of the predefined SCS is derived from 120 kHz.

9. The baseband processor of claim 1, wherein a slot number is between 0 to 79.

10. The baseband processor of claim 1, wherein a PRACH duration is 24 for the second PRACH preamble format.

11. The baseband processor of claim 1, wherein the two consecutive ROs are merged into an RO with the predefined SCS.

12. The baseband processor of claim 1, wherein a floor operation is added to calculate a time index of a PRACH transmission symbol.

13. The baseband processor of claim 1, wherein the predefined SCS includes 480 kilohertz (kHz) and 960 kHz.

14. A user equipment (UE) device comprising:

at least one antenna;

at least one radio, wherein the at least one radio is configured to communicate with a second UE of a communication network using the at least one antenna; and at least one processor coupled to the at least one radio, wherein the at least one processor is configured to perform operations comprising:

receiving Physical Random Access Channel (PRACH) configuration information including an indication of a first PRACH preamble format for a predefined subcarrier spacing (SCS) to enhance cell coverage, wherein the PRACH configuration information further includes a field that indicates a second PRACH preamble format in a time-domain based on a short sequence PRACH preamble format that extends the short sequence PRACH preamble format, wherein the short sequence PRACH preamble format is repeated over two consecutive time-domain random access channel (RACH) occasions (ROs) and the two consecutive ROs are linked to a synchronization signal block (SSB)/Channel State Information Reference Signal (CSI-RS) or two or more different SSBs/CSI-RSs;

receiving RACH configuration information;

transmitting a PRACH preamble using the first and second PRACH preamble formats over a PRACH to a base station (BS); and based on a field comprised in the RACH configuration information that indicates that a listen before talk (LBT) procedure is not required before a RACH procedure, transmitting a RACH Message 1 as a short control signaling without performing the LBT procedure.

15. A base station (BS) comprising a processor configured to perform operations comprising:

generating Physical Random Access Channel (PRACH) configuration information including an indication of a PRACH preamble format in a time-domain based on a short sequence PRACH preamble format for a predefined subcarrier spacing (SCS) to enhance cell coverage, wherein the short sequence PRACH preamble format is repeated over two consecutive time-domain random access channel (RACH) occasions (ROs) and the two consecutive ROs are linked to a synchronization signal block (SSB)/Channel State Information Reference Signal (CSI-RS) or two or more different SSBs/CSI-RSs;

generating RACH configuration information including a field that indicates that a listen before talk (LBT) procedure is not required before a RACH procedure;

transmitting the PRACH configuration information and the RACH configuration information to a user equipment (UE); and receiving a RACH Message 1 from the UE as a short control signaling without the LBT procedure.

16. The BS as in claim 15, wherein the short sequence PRACH preamble format includes B4 format.

* * * * *